(No Model.) 3 Sheets—Sheet 1.
J. M. GARDNER.
COTTON GIN.
No. 348,900. Patented Sept. 7, 1886.
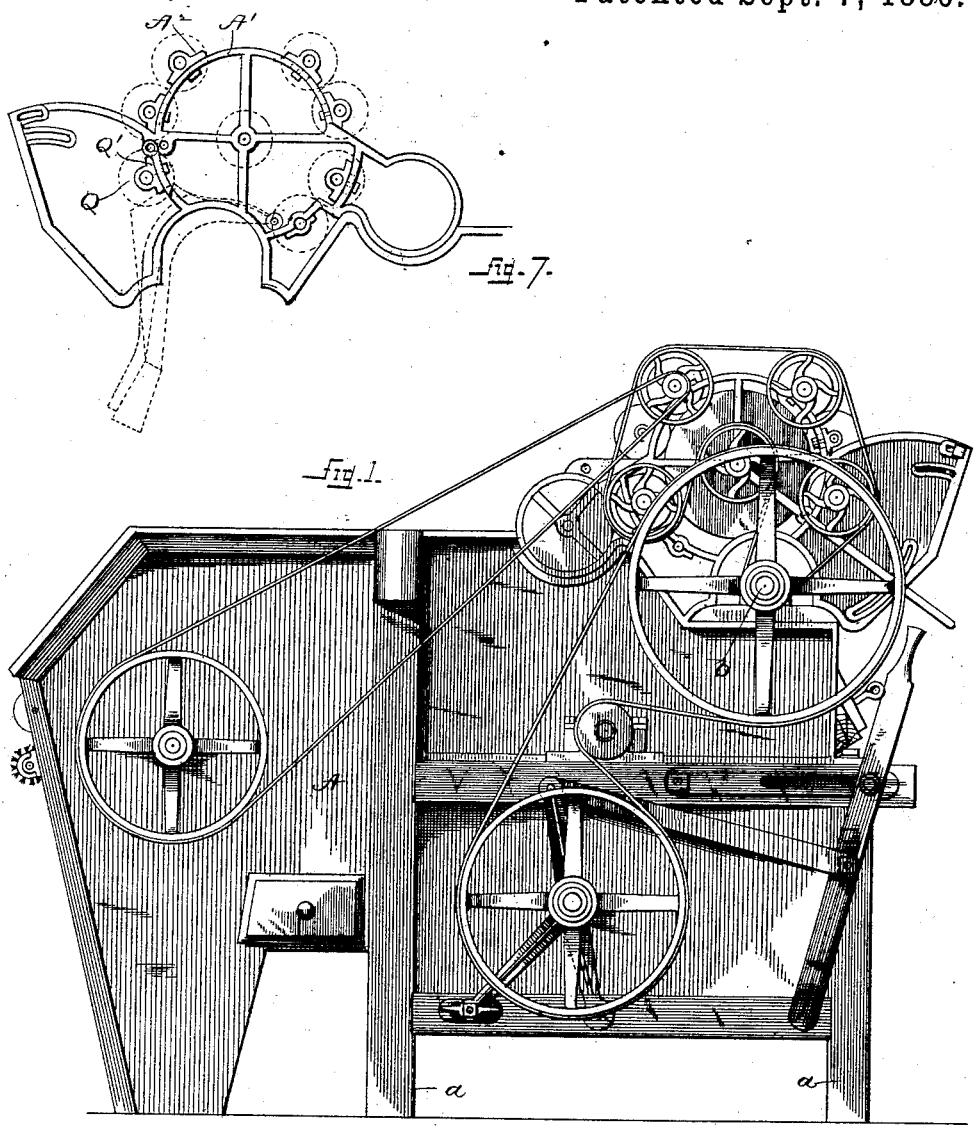
Witnesses:
W. W. Mortimer
David H. Mead
Inventor.
Jefferson M. Gardner.
by R. G. Dyrenforth,
his Attorney (No Model.) 3 Sheets—Sheet 2.
J. M. GARDNER.
COTTON GIN.
No. 348,900. Patented Sept. 7, 1886.
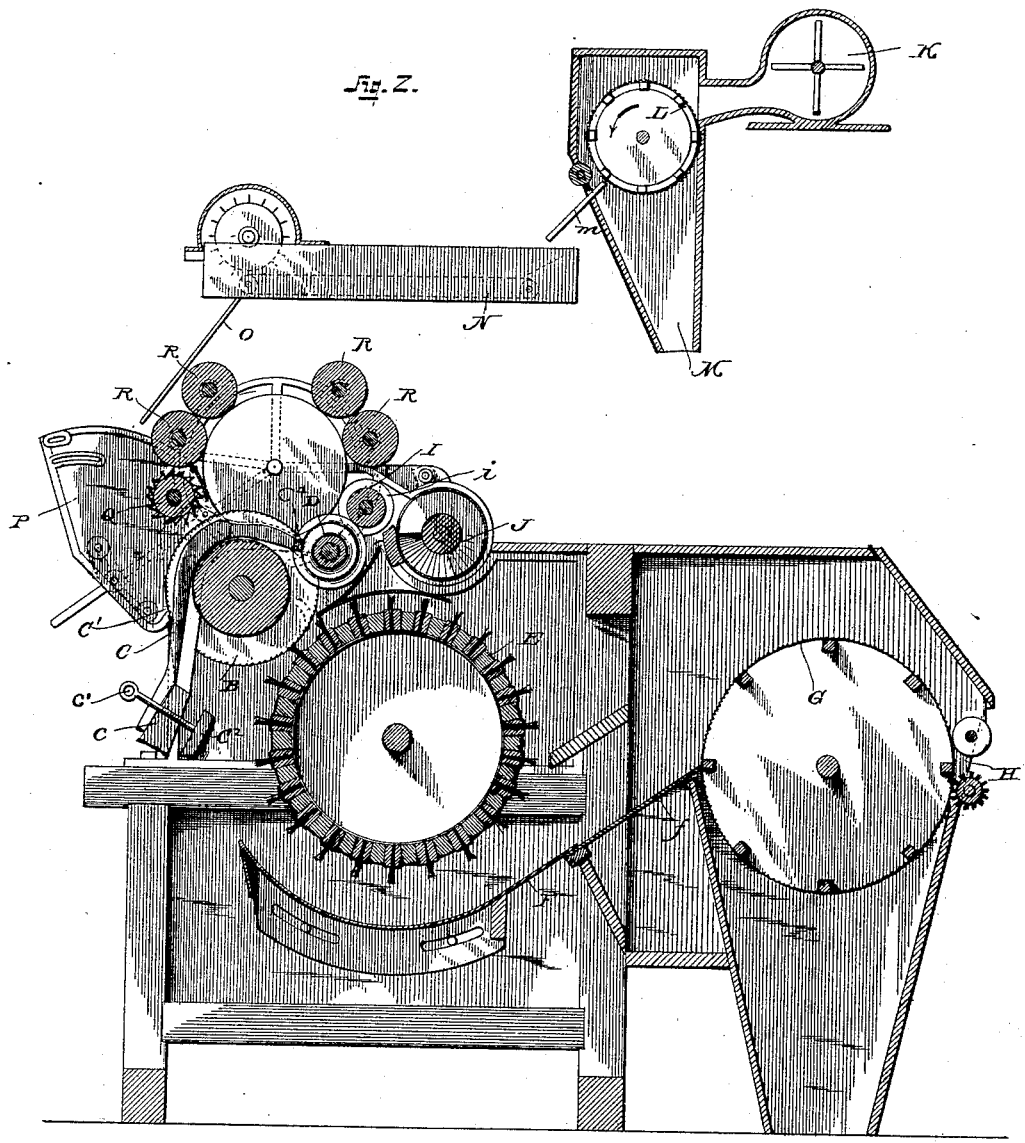
Witnesses:
N. W. Mortimer
David H. Mead
Inventor.
Jefferson M. Gardner,
by R. J. Dyrenforth,
his Attorney (No Model.) 3 Sheets—Sheet 3.
J. M. GARDNER.
COTTON GIN.
No. 348,900. Patented Sept. 7, 1886.
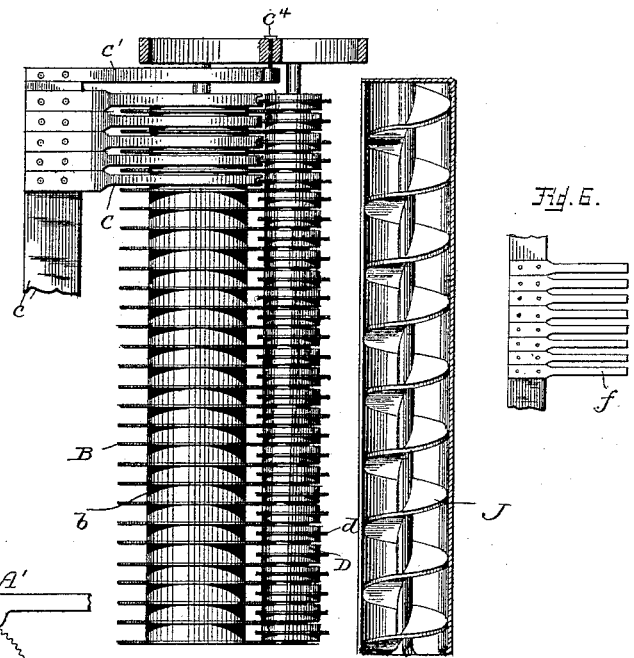
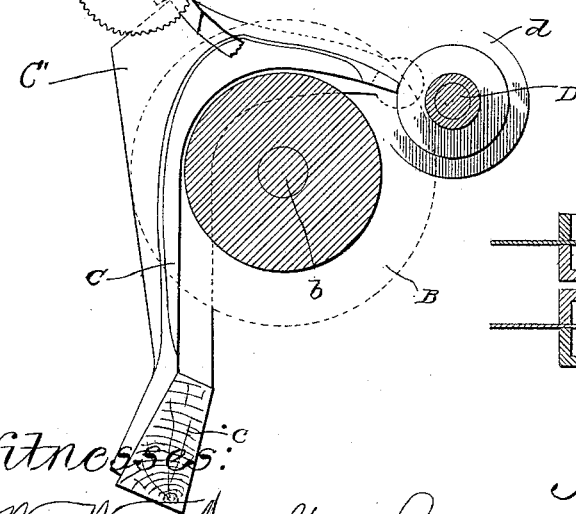
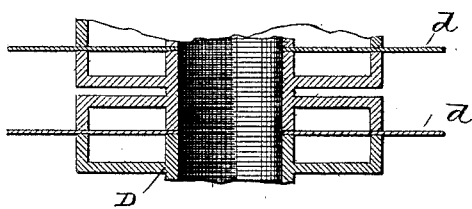
Witnesses:
W. W. Mortimer
David Smead
Inventor:
Jefferson M. Gardner,
by R. G. Dyrenforth,
his Attorney

UNITED STATES PATENT OFFICE.

JEFFERSON M. GARDNER, OF NASHVILLE, TENNESSEE, ASSIGNOR OF TWO-THIRDS TO STEWART & BRUCKNER, OF SAME PLACE.

COTTON-GIN.

SPECIFICATION forming part of Letters Patent No. 348,900, dated September 7, 1886.

Application filed June 10, 1886. Serial No. 204,761. (No model.)

*To all whom it may concern:*

Be it known that I, JEFFERSON M. GARDNER, a citizen of the United States, residing at Nashville, in the county of Davidson and State of Tennessee, have invented certain new and useful Improvements in Cotton-Gins; and I do hereby declare the following to be a full, clear, and exact description of the invention, such as will enable others skilled in the art to which it appertains to make and use the same.

This invention relates to cotton-gins.

The object of the invention is to produce a gin whereby cotton may be ginned in such manner as to more completely prevent cutting of the staple in the process of ginning than has been possible by gins as heretofore constructed.

Furthermore, the object is to produce a gin comprising novel constructions and arrangements of parts, whereby it may be adjusted for ginning long or short staple cotton.

Furthermore, the object is to produce a feeder and cleaner of novel construction to clear the cotton from any extraneous matter more completely than has been heretofore done, and convey it either from a wagon, room, or the like to the gin.

With these objects in view my invention resides, essentially, in a cotton-gin comprising a series of saws and a roller provided with grooves entered by the saws, and with flanges extending above the surface of the same, whereby the cotton is directed and carried through the grooves in such manner as to prevent cutting or tearing of the fiber.

Furthermore, the invention resides in a cotton-gin comprising a series of saws, a grooved and flanged roller mounted contiguous thereto, and a series of ribs interposed between the saws and mounted upon a frame which is pivoted at a point coincident with the face of the roller.

Furthermore, the invention resides in various novel details of construction and peculiarities of arrangement, whereby the objects of the invention are attained and a more perfect and uniform ginning of the cotton insured.

I have illustrated the invention in the accompanying drawings, in which Figure 1 is a side elevation of a gin constructed in accordance with my invention. Fig. 2 is a similar view showing the casing and external driving-wheels removed in order to disclose the interior disposition of the operative parts, also showing the means for feeding the cotton to the gin and freeing the staple from light dust, &c. Fig. 3 is a detail view showing in plan a portion of the saws and a section of the grooved and flanged roller, in conjunction with which the saws work, and the adjustable ribs. Fig. 4 is a detail view showing the relative positions of the saws, the grooved roller, and the bar which supports the series of adjustable ribs. Fig. 5 is a detail sectional view showing the relative arrangement and positions of the grooves and flanges upon the roller. Fig. 6 shows a series of fingers, which form a way for conducting the cotton from the brush to the point of discharge. Fig. 7 is a detail view showing the end of the breast of the gin, also showing in dotted lines the adjustable ribs and the corrugated roller, whereby the cotton is freed from bolls before entering the breast of the gin, and also showing in dotted lines the rollers which form the interior surface of the breast of the gin, and the frame carrying adjustable bearings for the rollers.

In these drawings, A represents the frame of the gin, which is supported upon suitable legs, $a$. At the upper portion of the frame A is hinged a frame provided with adjustable bearings $A^2$, for the rollers which form the interior surface of the breast of the gin. This frame is so arranged that it may be raised at will to expose the interior of the gin. The shaft $b$ carries the saws B, of which any desired number may be employed. The saws are situated a suitable distance apart, and between each two of them is placed a rib, C. The ribs C are all mounted upon a bar, $c$, placed at a convenient point below the saws. This bar is supported upon two hangers, C', which are of the same length as the ribs C, and are pivoted to the frame A at a point, C², coincident with the surface of the grooved roller, so that the ends of the ribs are always in proper contact with the face of the roller. Those portions of the ribs which are contiguous to the operative portions of the saws are of the same general contour as the saws, so that by raising and lowering the ribs the amount of surface of the saws which is exposed may be regulated. The raising and lowering of the ribs is accomplished by means of setscrews $c'$, which pass through the bar $c$ at each end and bear against blocks $C^2$. Thus it will be seen that the ribs may be raised and lowered at will, in order to change the depth of the cut of the saws, and at the same time the ends of the ribs will remain nearly in contact with the surface of the grooved roller.

D represents a roller provided with grooves of such width as to allow the passage of the saws with such a quantity of fiber as would ordinarily be carried by the teeth of the saws, and this roller is mounted in such position as to insure the passage of the teeth of the saws close to the shaft of the roller.

In the operation of saw-gins as ordinarily constructed great difficulty has been experienced from the fact that when the fiber of the staple is long, the same portions are acted upon at once by two or more saws, thus unavoidably breaking or tearing the fiber, and consequently materially shortening the product. I have aimed to overcome this difficulty, and to that end have provided the roller D with a series of flanges, $d$, placed equidistant from and higher than the general surface of the roller and the grooves which are entered by the saws.

In the operation of the saws, in conjunction with this flanged and grooved roller, the fiber is disengaged by the flanges from the saws nearest the free end of the fiber, and is allowed to be carried by the saw nearest the seed to the groove, where it is removed from the seed. The ends of the ribs are forked and each one of them straddles one of the flanges $d$. The fiber, after being carried through the grooves in the roller D, is removed from the saws by means of the brush E, and by this is carried to a mote-board, F. At the outer end of the mote-board is placed a series of fingers, $f$, extending from the board to a wire-reel, G, and in a direction coincident with the direction of the current of air which is generated by and carries the cotton from the brush. Any loose dirt or heavy substances which are freed from the cotton drop between the fingers. The seed-cotton in the breast is in the form of a roll, from the outside of which the roll of cotton to be freed from seed is taken by the saws, and that portion of the roll of cotton which is not reached by the saws is rolled around in the breast and again presented to the saws. The roller I moves the mass of cotton onward from the saws, and it is then acted upon by the balance of the rollers in the breast. The roller I is grooved to receive the flanges of the roller D, in order that their surfaces may work close together. The clean seed which is freed from the fiber by the action of the saws is carried on the outside of the mass or roll of cotton and discharged through an opening, $i$, to a conveyer, by which it is carried to any desired point of discharge.

In cleaning and feeding the cotton to the gin, I prefer to use the device shown in Fig. 2 of the drawings. This consists, essentially, of a fan, K, into the eye of which cotton is carried through a conduit leading from a wagon, floor, or other place of deposit. From the fan the cotton is discharged into a casing upon the wire-reel L, through which a continuous current of air passes from the fan and down and out through the discharge-opening M in the casing. The reel being made of wire, any loose dirt carried by the cotton is carried through the meshes of the wire down into the casing and out of the discharge opening. The cotton is carried over the surface of the wire to a chute, $m$, and thence discharged into the feed-box upon an endless belt, N, which conveys it to a chute, O, discharging into the feed-box P of the gin. The cotton is carried from the feed-box to the breast of the gin by means of the saws, and passes under and in contact with the fluted or corrugated roller Q, which frees it from bolls, sticks, or the like. The bearings Q' of the corrugated roller Q are attached to the head A' in such position that the supports C' of the ribs will raise the bearings, and thus allow the roller to be lifted clear of the ribs when the latter are raised to expose a small amount of surface of the saws.

The interior surface of the breast of the gin is formed by a series of rollers, R, which have continuous rotary motion, so that the mass of cotton is moved in an opposite direction and brought continuously to the action of the saws. The purpose of these rollers is to prevent any undue friction of the cotton in its passage, which would render the movement slow or irregular.

Having thus fully described my invention, what I claim, and desire to secure by Letters Patent, is—

1. In a cotton-gin, the combination of a series of saws and a grooved and flanged roller placed contiguous thereto, the flanges being higher than the general surface of the roller and the grooves, substantially as described.

2. A cotton-gin comprising a pivoted frame, a series of saws, a grooved and flanged roller mounted contiguous thereto, and a series of ribs interposed between the saws and mounted upon the frame which is pivoted at a point coincident with the face of the roller.

3. A cotton-gin comprising a pivoted frame, a series of saws, a grooved and flanged roller mounted contiguous thereto, a series of ribs interposed between the saws and mounted upon said frame, which is pivoted at points coincident with the surface of the roller, set-screws passing through the frame, and the stationary blocks, substantially as described.

4. A cotton-gin comprising a pivoted frame, a series of saws, a flanged and grooved roller mounted contiguous thereto, a series of ribs mounted upon the said frame, which is pivoted at points coincident with the surface of the roller, the ends of the ribs being forked and straddling the flanges of the roller, substantially as described.

5. A cotton-gin comprising a series of saws, a flanged and grooved roller mounted contiguous thereto, a roller mounted above the flanged and grooved roller, and a series of ribs interposed between the saws, substantially as described.

6. A cotton-gin comprising a series of saws, a grooved roller mounted contiguous thereto, a series of ribs interposed between the saws, a frame therefor pivoted coincident with the surface of the roller, a corrugated roller mounted contiguous to the saws, and movable bearings therefor, the said bearings being in contact with the frame carrying the ribs, substantially as described.

7. In combination with a feed box or hopper of a cotton-gin, a feeder and cleaner consisting of the fan, a wire reel upon which the fan discharges, the casing having the dust-discharge opening and an exit-opening for the passage of the cotton, and an endless belt for conveying the cotton from the discharge-opening to the gin, substantially as described.

In testimony whereof I affix my signature in presence of two witnesses.

JEFFERSON M. GARDNER.

Witnesses:
ROBINSON WHITE,
WILLIAM H. GIVEN.